Oct. 5, 1937.   J. W. ERB   2,094,879
TREATING APPARATUS
Filed Sept. 1, 1933   3 Sheets-Sheet 1
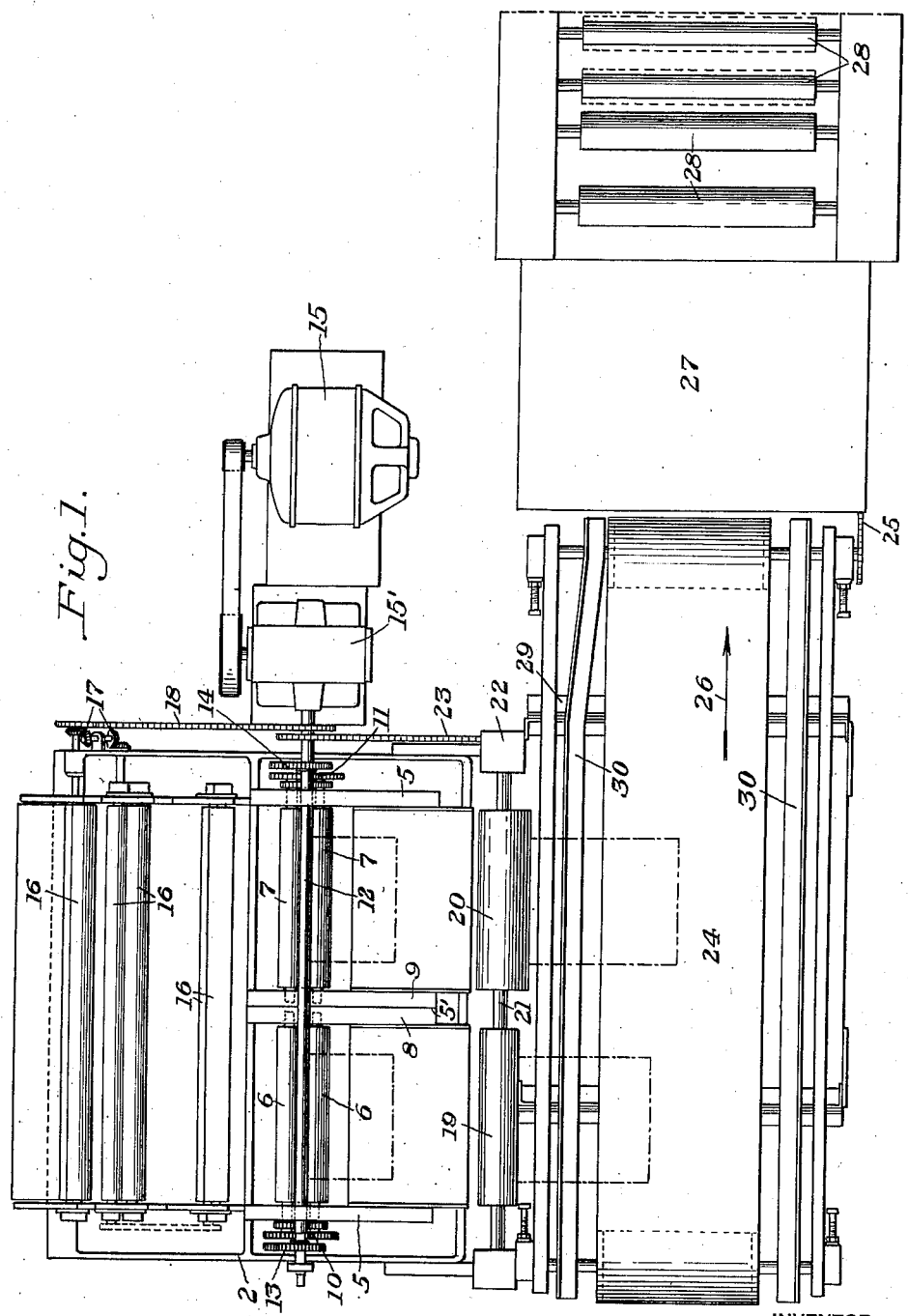

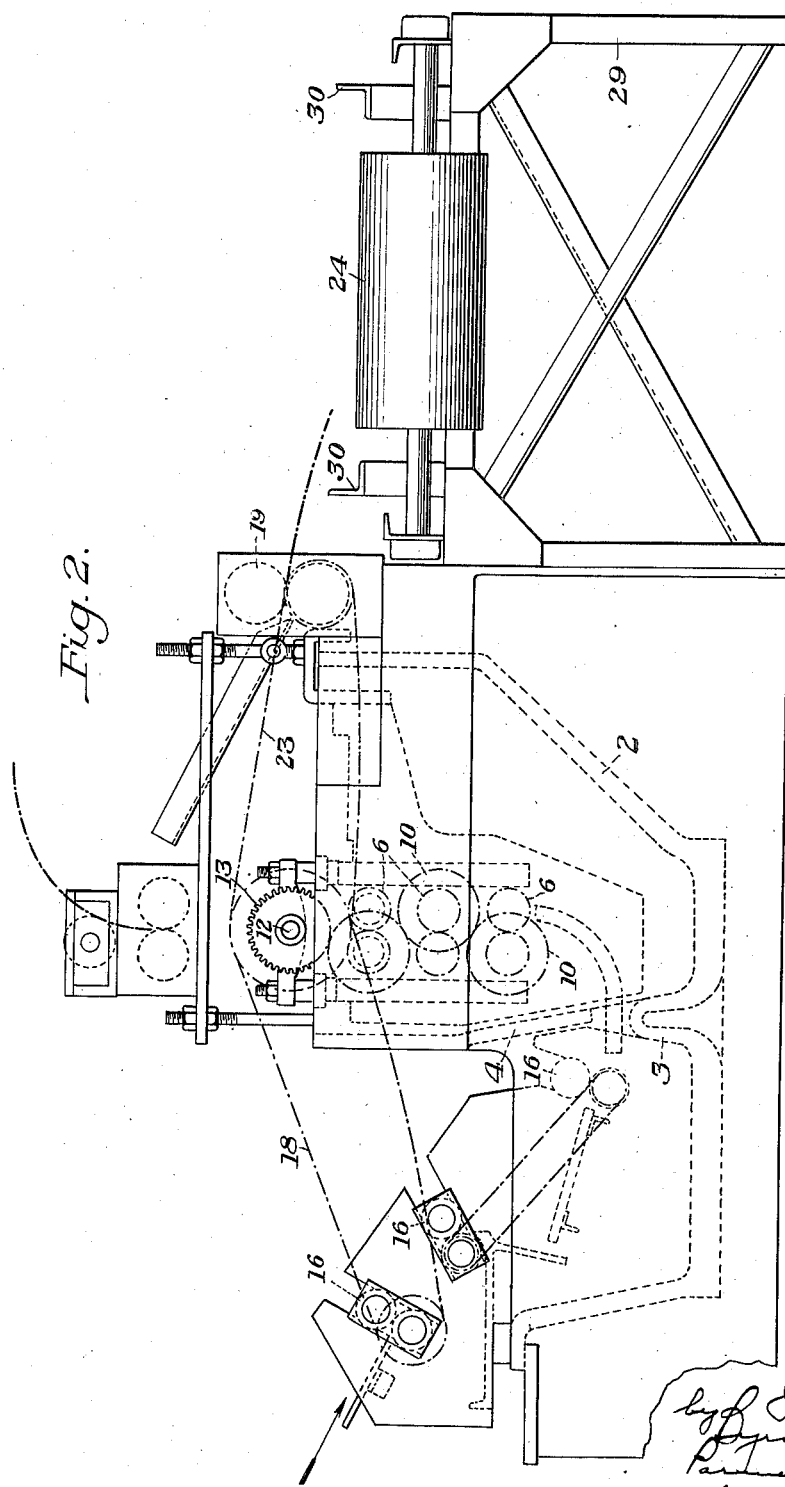

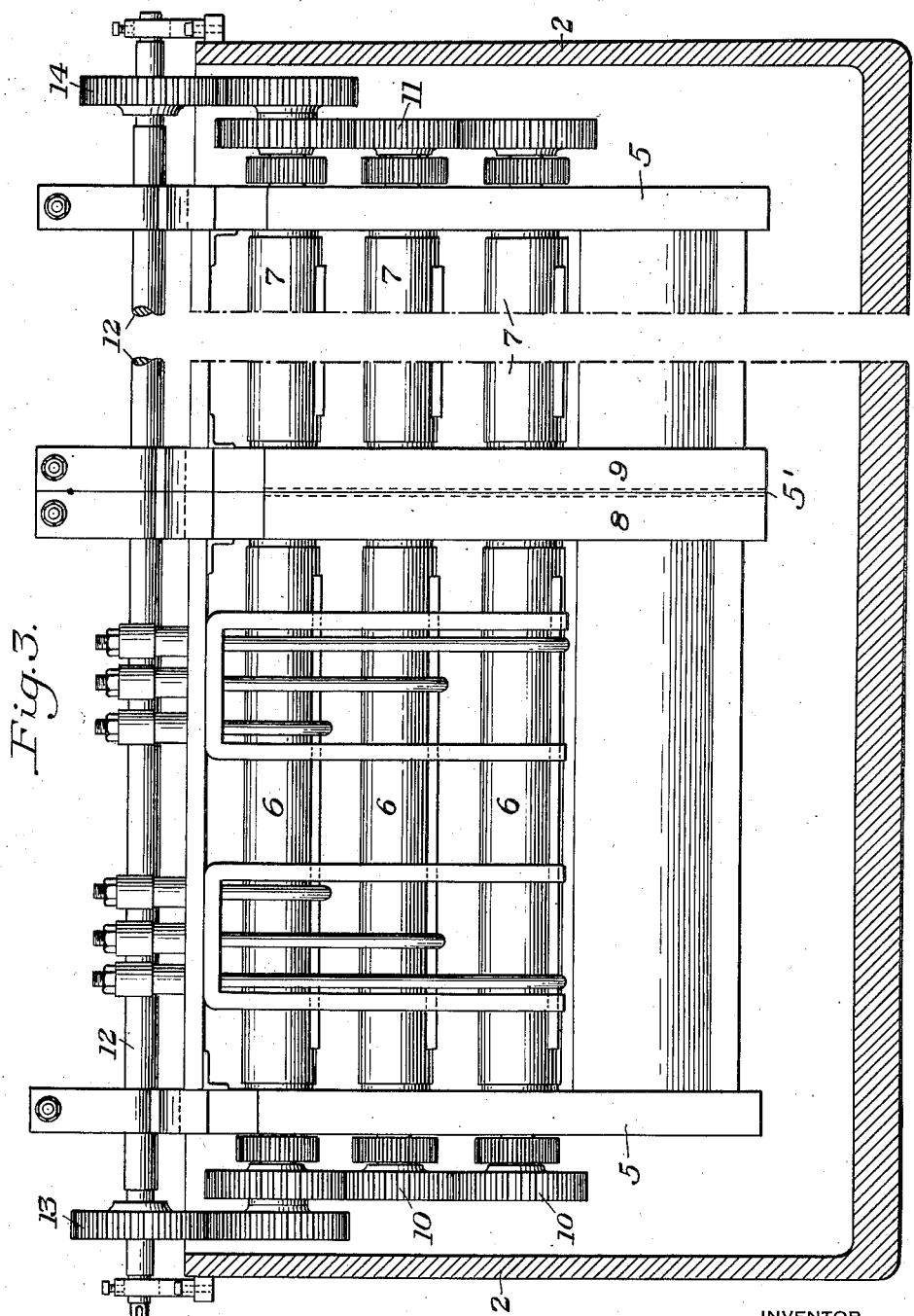

Patented Oct. 5, 1937

2,094,879

UNITED STATES PATENT OFFICE 2,094,879

TREATING APPARATUS

John W. Erb, Martins Ferry, Ohio, assignor to Wheeling Steel Corporation, Wheeling, W. Va., a corporation of Delaware Application September 1, 1933, Serial No. 687,790

6 Claims. (Cl. 91—12.2)

This invention relates broadly to treating apparatus. It relates more particularly to apparatus comprising a plurality of mechanisms for advancing material generally in parallel through a treating zone.

In certain of its more specific aspects the invention relates to coating apparatus for separately passing material in parallel and relatively to a source of coating material. Still more particularly the invention has to do with tinning apparatus comprising a tin pot and a plurality of roll conveyors for advancing material to be tinned generally in parallel through the tin pot, each of the conveyors being less than twice as wide as the material.

Although as above indicated the invention in its broader aspects is not limited to tinning or even coating, it is especially well adapted for performing operations of this character, and as a specific example for purposes of illustration and explanation I shall describe apparatus intended for tinning metal sheets.

It has been customary in tinning metal sheets to pass the same through a tin pot by means of rolls, the sheets passing between pairs of guiding and feeding rolls enough of which are driven to insure feeding or advancement of the sheets.

I utilize a plurality of mechanisms such, for example, as roll conveyors preferably driven in synchronism as by common driving means for advancing generally in parallel material to be treated. In the case of a tinning machine, material is advanced side by side through the tin pot. Each mechanism is preferably less than twice as wide as the material so that rolls may be used which will not have objectionable spring, and which will evenly and economically coat the sheets and move them rapidly through the tinning apparatus.

The sheets preferably move through the tinning apparatus substantially in synchronism throughout at least a portion thereof, and may then be delivered substantially side by side to a run-off conveyor which may carry the sheets to a washer, cleaner and piler or other mechanism. The run-off conveyor preferably extends transversely of the direction of delivery of the sheets from the conveyors which advance them through the tin pot. Movement of the sheets substantially in synchronism through the pot and delivery thereof in similar manner to the run-off conveyor insures against delivery of the sheets to the run-off conveyor in such manner that they will fall one upon another, and to this end I prefer to drive by a common driving means the conveyors which advance the sheets through the tin pot.

I also provide for delivering at different times material fed to the respective conveyors or advancing mechanisms simultaneously. This can be done while still driving the conveyors by a common driving means by providing one of the conveyors with at least one roll of larger diameter than a corresponding roll of another conveyor. Thus, the former will deliver material faster than the latter when rotating at the same angular speed. When such an arrangement is utilized, the sheet in the direction of advance of the run-off conveyor is preferably fed thereto somewhat ahead of the companion sheet or sheets so that the former will be deposited on the run-off conveyor somewhat earlier than the latter, thus avoiding any possible piling up or overlapping of the sheets on the run-off conveyor.

Other details, objects and advantages of the invention will become apparent as the following description of a present preferred embodiment thereof proceeds.

In the accompanying drawings I have shown a present preferred embodiment of the invention, in which Figure 1 is a top plan view of tinning apparatus;

Figure 2 is an elevational view of the apparatus shown in Figure 1; and

Figure 3 is a vertical cross-sectional view to enlarged scale with a portion cut away through the tinning apparatus, showing portions of the conveyors for advancing the sheets through the tin pot and the driving mechanism therefor.

Referring more particularly to the drawings, there is provided a receptacle or tin pot 2 which may be of any desired or well known construction and which is adapted to contain a bath of suitable tinning material which may be heated in accordance with well known practice. The pot has an upwardly extending wall 3 and a downwardly extending wall 4, the latter of which is adapted to intersect the surface of the bath, as is usual in constructions of this character.

There are provided a pair of outer frame members 5 and inner frame means 5' disposed between the outer frame members, said frame members and means being suitably mounted with respect to the pot 2 to carry a pair of mechanisms for advancing sheets through the pot, said mechanisms in the present preferred embodiment shown in the drawings comprising sets of rolls 6 and 7 constituting roll conveyors adapted to advance the sheets through the pot generally in side by side relationship or in parallel. Conveniently, the respective rolls 6 are in axial alinement with corresponding rolls 7. The left-hand frame member 5, viewing Figure 3, carries bearings for the left-hand extremities of the rolls 6, and the right-hand frame member 5 carries bearings for the right-hand extremities of the rolls 7. The inner frame means 5' comprises oppositely disposed portions 8 and 9, the portion 8 carrying bearings for the right-hand extremities of the rolls 6 and the portion 9 carrying bearings for the left-hand extremities of the rolls 7. Preferably, each roll 6 is entirely separated from the corresponding and axially alined roll 7, so as to make it possible, if desired, to operate such rolls at different speeds, although for certain purposes it may be desirable to have each roll 6 and the corresponding axially alined roll 7 integrally connected so as always to operate as a unit but with the intermediate bearing means carried by the inner frame means 5'.

Each roll conveyor is preferably driven in a manner somewhat similarly to that in which roll conveyors in tin pots have been driven heretofore, and the rolls are arranged with respect to the tin pot in conventional manner. Certain of the rolls 6 are provided with gearing 10 of more or less conventional type, and certain of the rolls 7 are provided with similar gearing 11. There is provided a common driving shaft 12 extending completely across the apparatus, such shaft being provided with gears 13 and 14 respectively cooperating with the gearings 10 and 11 whereby to substantially synchronously drive the respective roll conveyors. The shaft 12 is driven by a motor 15 through suitable connections and reducing gearing 15'.

There are also provided rolls 16 for initially introducing the sheets into the pot, these rolls extending completely across the pot, and hence being over twice as long as the rolls 6 or the rolls 7, and likewise having a length over twice as great as the widths of sheets fed to the pot thereby. As these rolls are only feeding rolls and do not have anything to do with the application of the coating to the sheets, it is not of great importance whether or not they uniformly engage the sheets. The rolls 16 may to all intents and purposes be the same as the corresponding rolls in conventional tinning machines heretofore used. The rolls 16 are driven by suitable gearing 17 and a sprocket chain 18 driven from the driving shaft 12. As this driving mechanism is of conventional type, it need not be described in detail.

Rolls 19 and 20 are provided respectively for delivering from the tin pot the sheets passed between the rolls 6 and 7. The rolls 19 and 20 are mounted on parallel shafts 21 driven through suitable gearing 22 by a sprocket chain 23 from the driving shaft 12. The rolls 20 are of greater diameter than the rolls 19. This is so that upon rotation of the shafts 21 a sheet being delivered by the rolls 20 will move ahead faster, and consequently be delivered sooner than a sheet being delivered by the rolls 19, even though such sheets entered the respective sets of rolls 19 and 20 simultaneously.

There is provided a run-off conveyor 24 comprising an endless belt driven from any suitable source of power through a sprocket chain 25 in the direction of the arrow 26 in Figure 1. The conveyor 24 is positioned to receive the sheets delivered by the rolls 19 and 20 and to carry the same to a washer 27, whence they are carried by rolls 28 to a cleaner and piler or other suitable mechanism not shown. The conveyor 24 is mounted in any suitable manner upon a framework 29, and guide rails 30 are provided for insuring proper guiding of the sheets as they are advanced on the run-off conveyor.

By reason of the provision of the rolls 6 and 7 the respective sheets which are passed side by side through the tin pot will be subjected to substantially the same roll pressure from end to end, resulting in an even coating. Due to the increased speed at which the rolls 6 and 7 can be operated the production is very materially increased. The sheets are delivered from the last rolls 6 and 7 substantially side by side, and could be delivered to the run-off conveyor 24 in similar relationship simply by providing rolls 19 and 20 of the same size, but by making the rolls 20 of greater diameter than the rolls 19, the sheet in the direction of advance of the run-off conveyor is delivered to such conveyor before the other sheet, thus doubly insuring against overlapping or piling up of the sheets on the run-off conveyor. The speed of the run-off conveyor is regulated so that there will be no overlapping or piling up thereon of successively delivered sheets.

The minute details of the apparatus have not been described because, in the main, it is constructed similarly to tin pots as heretofore used, the main differences being the use of the sets of short rolls 6 and 7, the delivery rolls 19 and 20 and the run-off conveyor 24, especially in the manner indicated. As above noted, particular advantages in the quality of the product, the speed of operation and the efficiency of the operation are obtained by reason of the provisions above described.

While I have shown and described a present preferred embodiment of the invention, it is to be distinctly understood that the same is not limited thereto but may be otherwise variously embodied within the scope of the following claims.

I claim:

1. Treating apparatus, comprising a treating zone, means for advancing articles to be treated generally in separate parallel paths and relatively to said treating zone and with articles in the respective paths disposed substantially in side-by-side relationship, conveying means for receiving the articles from said first mentioned means and conveying the same transversely of said paths, and means so constructed and arranged as to advance an article in one of said paths relatively to the corresponding article in another of said paths, while said articles are moving simultaneously, sufficiently to insure delivery of said first mentioned article to said conveying means prior to delivery of said second mentioned article.

2. Treating apparatus comprising a treating zone, continuously operating means for advancing generally in separate parallel paths and relatively to said treating zone articles to be treated introduced into the apparatus in said separate parallel paths substantially in side-by-side relationship and conveying means for receiving the articles from said first mentioned means and conveying the same transversely of said paths, said first mentioned means being so constructed and arranged as to deliver one of said articles to said conveying means prior to delivery of the corresponding article in another of said paths.

3. Treating apparatus, comprising a treating zone, mechanisms respectively advancing generally in separate parallel paths and relatively to said treating zone articles to be treated introduced into the apparatus in said separate parallel paths substantially in side-by-side relationship, and conveying means for receiving the articles from said mechanisms and conveying the same transversely of said paths, one of said mechanisms having continuously operating means forming a part thereof so constructed and arranged as to deliver one of said articles to said conveying means prior to delivery of the corresponding article in another of said paths.

4. Metal coating apparatus, comprising metal coating means, means for advancing generally in separate parallel paths and through said metal coating means articles to be coated with metal introduced into the apparatus in said separate parallel paths substantially in side-by-side relationship, and conveying means for receiving the articles from said first mentioned means and conveying the same transversely of said paths, said first mentioned means having continuously operating means forming a part thereof so constructed and arranged as to deliver one of said articles to said conveying means prior to delivery of the corresponding article in another of said paths.

5. Sheet coating apparatus, comprising sheet coating means, roll conveyor means for advancing generally in separate parallel paths and through said sheet coating means sheets to be coated in said sheet coating means introduced into the apparatus in said separate parallel paths substantially in side-by-side relationship, and conveying means for receiving the sheets from said roll conveyor means and conveying the same transversely of said paths, said roll conveyor means having continuously operable means forming a part thereof so constructed and arranged as to deliver one of said sheets to said conveying means prior to delivery of the corresponding sheet in another of said paths.

6. Sheet treating apparatus, comprising means for advancing generally in separate parallel paths sheets to be treated introduced into the apparatus in said separate parallel paths substantially in side-by-side relationship, said means including simultaneously operable rolls of different diameters advancing one of said sheets relatively to another thereof, and conveying means receiving the sheets and conveying the same transversely of said paths, the relationship of the diameters of said rolls being such as to cause delivery of the sheets to the conveying means in desired spaced relation.

JOHN W. ERB.